July 10, 1928.
S. HERR
1,676,779
DEVICE FOR UNDERGROUND PROSPECTING
Filed Dec. 20, 1926
2 Sheets-Sheet 1
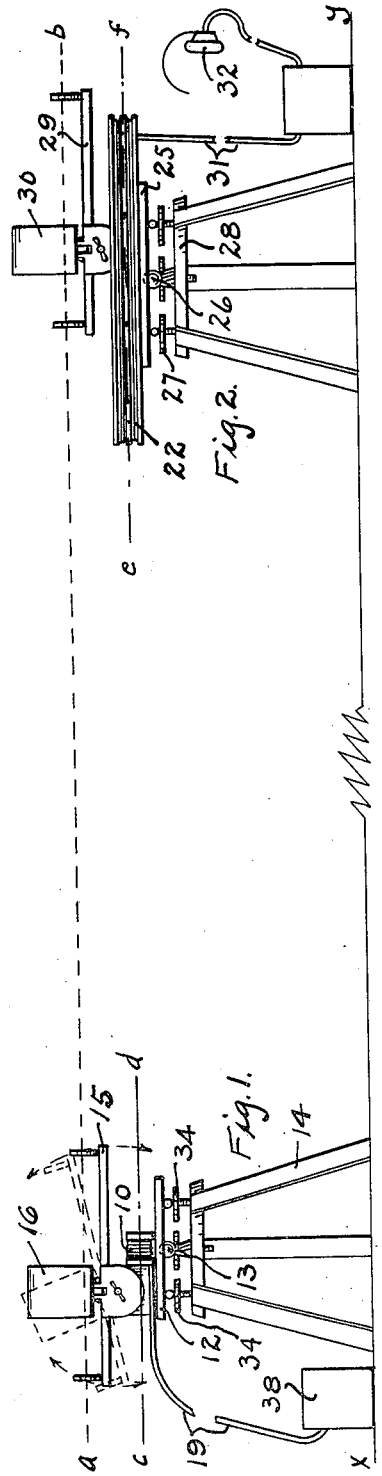
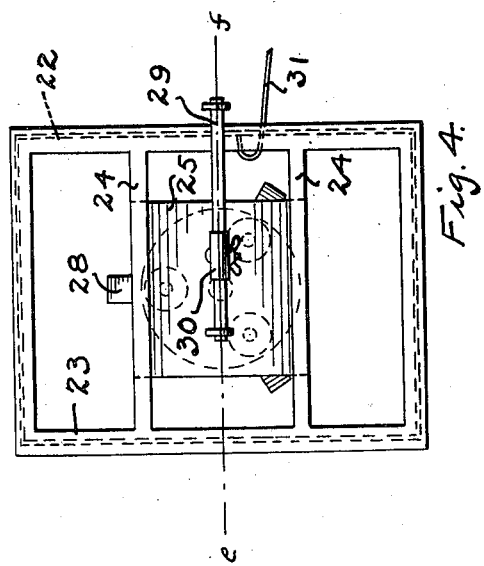
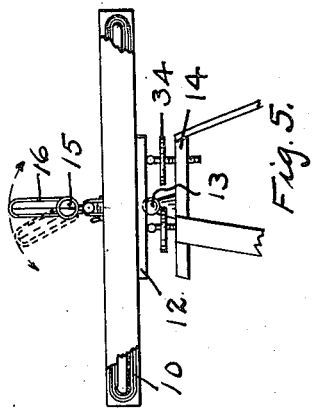
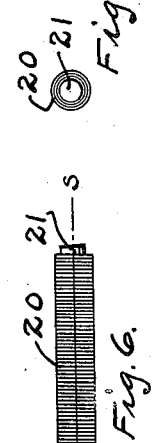
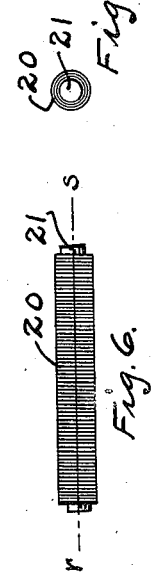
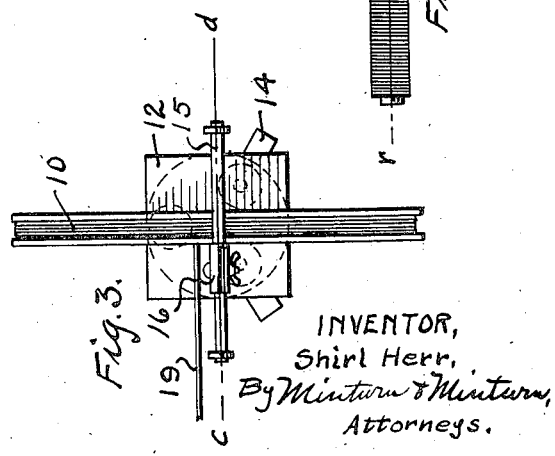
INVENTOR,
Shirl Herr,
By Minturn & Minturn,
Attorneys.

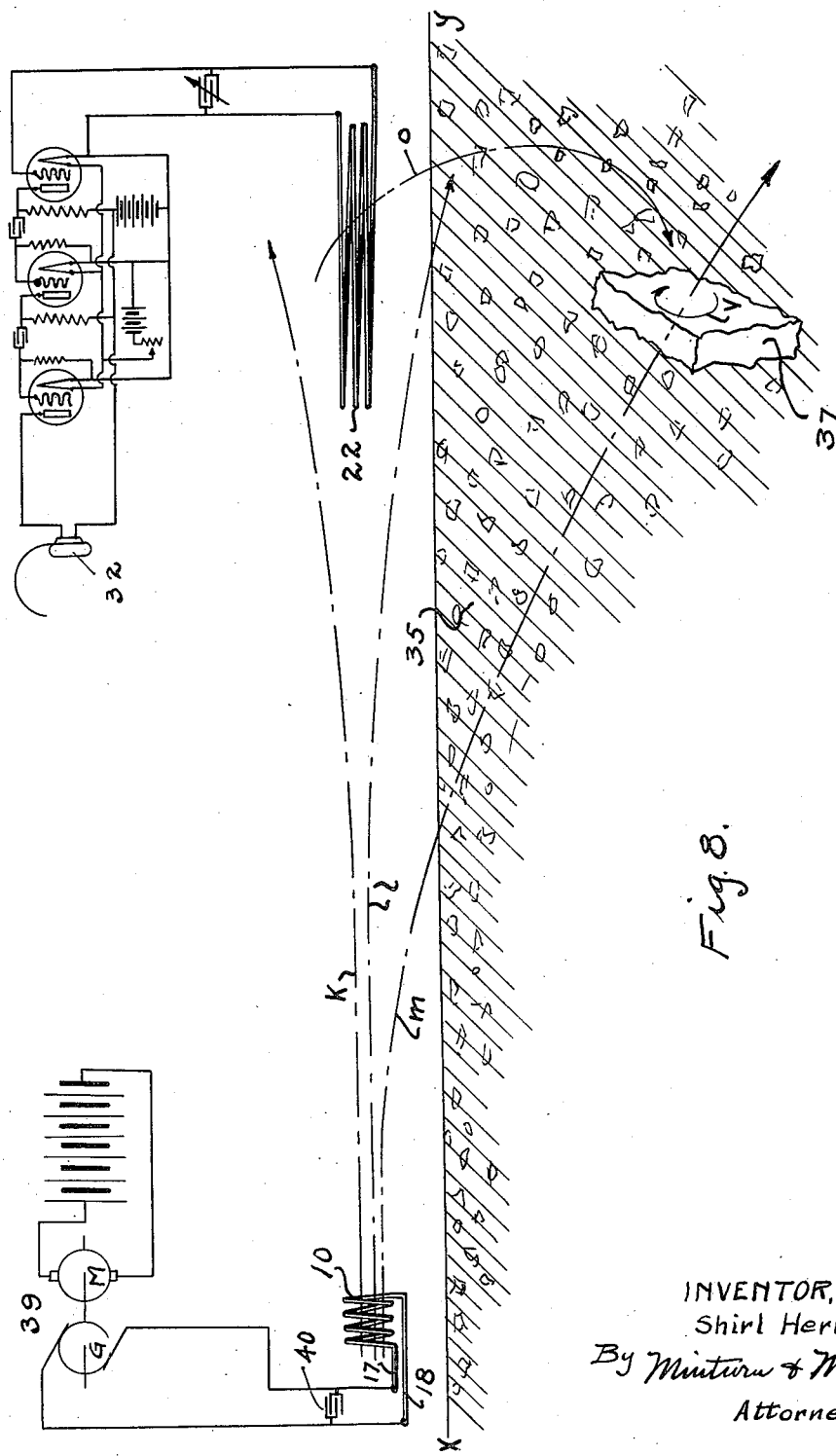

Patented July 10, 1928.

1,676,779

UNITED STATES PATENT OFFICE.

SHIRL HERR, OF CRAWFORDSVILLE, INDIANA.

DEVICE FOR UNDERGROUND PROSPECTING.

Application filed December 20, 1926. Serial No. 155,837.

This invention relates to a method of locating both magnetic and non-magnetic bodies or such substances hidden below the earth's surface, in all of which substances eddy currents may be induced, and the principle of the invention is based upon what might be appropriately termed magnetic reflection.

I am aware that methods have been previously disclosed for prospecting, in which methods, an electric current has been employed to induce a magnetic field in the region to be investigated. These older methods have been based either upon the upsetting of a differential effect between pairs of primary and secondary windings in close proximity one to the other, or upon the actual plotting of the direction of the lines of force in the induced field over the area being investigated and then comparing the results of that plotting to a "characteristic form," all of which procedure involves considerable expenditure of energy to cover the prospected area as well as considerable expert skill in arriving at correct deductions from the comparison of the actual field with the "characteristic" field, where it must be considered many variables must be taken into consideration due to the surface of the earth over which the investigations are being conducted not being in a perfect horizontal plane, and to the location of the inducing loop or coil.

In my invention, essentials of primary importance are, that the coil inducing the field in the region being investigated is never in any manner in electrical circuit with the earth, and further, is always adjustable and in portable relation to the secondary or detecting coil which is likewise never in electrical circuit with the earth and also is portable and adjustable in relation to the inducing coil; and that the inducing coil and the detecting coil are first adjusted in an initial set up in relation one to the other at a substantial distance apart, in a region known to have no substances within range of detection, whereby there is a minimum or no current output by the detecting coil, and then transferring the two coils to the region to be prospected with the two coils maintained in exactly the same relation one to the other as determined by the first set up, and any field set up by eddy currents induced by the primary coil coming within range of the detector coil will make itself known by inducing a current in the detecting coil and so indicate the presence of that body or substance in which the eddy currents exist without further traverse of the entire magnetic field as has heretofore been required as above indicated.

One particular form of my invention is here described in reference to the accompanying more or less diagrammatic drawings, in which—

Fig. 1, is a side elevation of the primary inducing coil unit;

Fig. 2, a side elevation of the secondary or detecting coil unit;

Fig. 3, a top plan view of the primary unit;

Fig. 4, a top plan view of the detecting coil unit;

Fig. 5, a fragmentary front elevation of the primary unit;

Fig. 6, a side elevation of a modified form of inducing coil;

Fig. 7, an end elevation of the modified inducing coil; and

Fig. 8, a combined wiring diagram and magnetic field diagram.

Like characters indicate like parts throughout the several views in the drawings.

The primary or inducing coil 10, here shown, has a peculiar shape, (Figs. 1, 3, and 5) in that in place of the customary circular winding, the coil is greatly elongated with major parallel sides brought closely together giving in effect a single straight line through which all magnetic lines of force pass between the two sides of the coil. The core 11 here shown is non-magnetic and may be formed of wood or rubber composition, or even be air only.

The coil 10 is mounted for convenience on a table 12 with the planes of its turns vertical so that the lines of force at the vertical plane of the coil are substantially horizontal. The table 12 is adjustably carried by a central bearing 13 and adjusting screws 34 on a tripod 14. Sights 15 and 16 are provided to aid in determining relative positions of the coil 10, as will be described later.

Conductors 17 and 18 lead from the terminals of the coil 10 through the cable 19 preferably in parallel and not twisted arrangement directly back from and at right angles to the coil 10 to a substantial distance from the coil 10 to any suitable means 38 for supplying an oscillating current which may be a battery operating through an automatic current interrupter, but preferably an alternating generator having a frequency of 500 or more cycles per second. In practice, I employ a storage-battery driven motor-generator set 39, and a condenser 40.

While the coil 10 here described gives good results, an inducing coil 20 of the more conventional type, Figs. 6 and 7, with circular windings and an iron core 21, may be substituted for the coil 10 positioned in the same relative manner to have its core 21 parallel to the ground.

The detecting coil 22 has a comparatively large number of turns about the periphery of a rectangular wooden frame 23, and the frame 23 by suitable cross pieces 24 is mounted on a table 25. The table 25 is supported by a central bearing 26 and adjusting screws 27 on a tripod 28, so that the frame 23 is substantially in a horizontal plane to bring the turns of the coil 22 likewise in substantially a common horizontal plane. The table 25 carries suitable sights 29 and 30 to determine relative angular positions of the coil 22 as will later be described.

From the terminals of the coil 22, conductors are led through the cable 31 to an amplifier here shown as a resistance coupled audion or vacuum tube amplifier and thence to an indicating means as the transmitter 32. A galvanometer or any suitable indicator may be substituted for the transmitter, as desired, to indicate a flow of current in the coil 22.

The operation of the invention will now be described. In Figs. 1 and 2, assuming the line $x-y$ to represent the ground line, at a location known to be free from substances not capable of having eddy currents induced in them, the coils 10 and 22 are set up on their respective mountings at some distance apart. It has been found that this intervening distance is dependent in length upon the power input in the coil 10 and the depth to which it is desired to investigate—the greater the depth investigated, the greater is the distance between the two coils 10 and 22.

The coils 10 and 22 are set up in the relation one to the other as indicated in Figs. 1 and 2, and 3 and 4. The coil 10 is positioned in relation to the earth's surface to have the turns of the coil vertical to the earth's surface or so that the lines of force within the core are parallel to the earth's surface.

The coil 22 is placed in an opposite position by having its turns substantially in a horizontal plane, such horizontal plane being parallel to the lines of force at the core of the coil 10, and not at right angles, as would be the customary method to obtain a current induced from a primary coil, but exactly the opposite to prevent the induction of a current in the coil 22. The plane of the coil 22 will in most cases include a line $c-d$, coil 10, or $r-s$, coil 20, extended axially through the core of the inducing coil on such a line $e-f$ as indicated in Figs. 2 and 4, and when the elongated coil 10 is employed, the major axis of its core (parallel to the winding) will likewise be included in the same horizontal plane of the coil 22.

A flow of current of the desired frequency is produced in the coil 10, and the coil 22 is adjusted in the position above described until there is a zero or minimum output of current indicated from the coil 22. Theoretically, the turns of the coil windings 22 being horizontal, no current would be produced in the coil 22 by the primary coil 10, but in practice, owing to the plurality of turns and other elements entering, the coil 22 may be adjusted to a position of minimum induced current only as opposed to an absolute zero output.

In practice both coils 10 and 22 are adjusted in position, one to the other, to secure this minimum, which minimum may be secured regardless of irregularity or slope of the earth's surface. After this minimum relation is determined, the sights above described as being carried by the coil mounting tables are aligned. The sights 15 and 29 are adjusted and fixed in alignment to indicate a straight line such as $a-b$, Figs. 1 and 2. Similarly, the sights 16 and 30 rockable in the planes normal to those of the sights 15 and 29 respectively are aligned and fixed.

The two coils 10 and 22 are then ready to be transported to the field to be investigated. The coils 10 and 22 are here spaced the same distance apart as they were when the minimum setting as above described was being obtained, and by manipulation of the tripods 14, and 28, the adjusting screws 34, and 27, the coils 10 and 22 are brought to exactly their same relative positions determined by the original minimum setting by use of the corresponding sights 15 and 29, and 16 and 30, it again making no difference as to the irregularity or contour of the surface in the field, the essential feature being that the two coils 10 and 22 must be set up in the same relationship one to the other irrespective of a horizontal base line, and that the plane of the turns of the winding of the coil 22 be substantially parallel to the earth's surface, though quite a little deviation from the parallel position may not influence the results sought.

Current is allowed to flow through the coil 10, and the transmitter 32 is held to the operator's ear. If no tone is heard, other than the minimum which is readily distinguished, there is no mass or single object present within range of the device. If a tone is heard, the presence of the object being sought is thereby at once announced. If no tone is produced, the two coils are moved to a new position, and so on, until the investigation is completed.

Fig. 8, is a diagrammatic illustration of the various induced effects produced in the operation of the invention. The coil 10, or 20, as the case may be, is here indicated as positioned above the surface of the earth 35 with the lines of force $k$, $l$, and $m$ set up by it, representing the principal direction of the magnetic field produced by the coil 10 in relation to the secondary or detecting coil 22. An object 37 being below the surface in the earth 35, being within the magnetic field set up by the coil 10, has certain lines of force passing through it which may be represented by the resultant line $m$. That object being more or less a conductor of electricity will have currents set up in it, induced by the field represented by the line $m$. Such induced currents are termed eddy currents and their E. M. F. will depend upon the strength of the field set up by the coil 10, the distance of the object from the coil 10, the mass of the object, and the electrical resistance of the object.

The resultant of such eddy currents may be represented by the line V. A magnetic field will be set up by such eddy currents, the resultant of the lines of force of which may be represented by the line O. Now the plane of the loops of the coil 22 being so positioned in relation to the coil 10, as to have no current induced in it by the field set up by the coil 10, will at the same time be positioned, not parallel to, but angularly to the line O, and a current will be induced in the coil 22 by this field represented by line O, which current is the indicating means showing the presence of that object 37, and it was this phenomenon that was indicated above by the term "magnetic reflection."

Attention is directed to the fact that the means for supporting the primary and secondary coils as well as the means for realigning the coils in the various positions to correspond to the original "minimum" setting may assume entirely different forms from those described, and therefore, the mechanical structure of the invention is not to be limited to such precise forms as shown and described, but may vary within the limits of the spirit of the invention.

The current employed in the primary coil to set up the primary magnetic field may be termed an oscillating current, by which term is included the usual alternating current, or a periodically varying direct current.

I claim:

1. The method of prospecting underground regions from the surface of the earth to locate buried objects, which comprises producing a magnetic field by passing an electric current through a primary coil set up in an initial position; setting up a detecting coil at a substantial distance from the primary coil and in a position relative to said primary coil where the minimum current will be induced in the detecting coil; of transferring said primary coil and said detecting coil to points in the territory to be prospected, the said two coils being set up at each point in the same relative positions one in respect to the other and at the same distance apart as was determined by the initial minimum setting; and of observing the current output at each setting.

2. In a detecting device, a primary coil, means for sending an electric current through the primary coil to set up a magnetic field, a secondary coil positioned at a substantial distance from said primary coil, said secondary coil having its axis substantially normal to the axis of said primary coil, each of said coils being adjustable and portable in relation to each other, means for detecting a current output from the secondary coil, and sight means permitting said two coils to be set up at various points in the same approximate relative positions one with the other.

3. The method of prospecting underground regions to locate buried objects which comprises producing a magnetic field by passing an electric current through a primary coil set up in an initial position in a territory known to be free from buried objects; setting up a secondary, detecting coil at a substantial distance from the primary coil and in a position relative to said primary coil and said detecting coil where the minimum current will be induced in the detecting coil; of determining the angular and linear positions of the said two coils with respect to each other in said minimum setting; of transferring said two coils to points in the territory to be prospected, the two coils being set up in each instance in approximately the same relative positions one in respect to the other and at the same distance apart as was determined by the initial minimum setting; of relatively adjusting said coils one with the other to cause a minimum current output from the detecting coil in the new setting; and of comparing the relative positions at such new minimum setting with the relative positions as determined by the initial minimum setting.

4. The method of prospecting underground regions from the surface of the earth to locate buried objects, which comprises producing a magnetic field by passing an electric current through a primary coil set up in an initial position; setting up a detecting coil at a substantial distance from the primary coil and in a position relative to said primary coil where the minimum current will be induced in the detecting coil;

of transferring said primary coil and said detecting coil to points in the territory to be prospected, the said two coils being set up at each point in the same relative positions one in respect to the other and at the same distance apart as was determined by the initial minimum setting; said primary coil having the same current input at the transferred position as was employed at the initial position; and of observing the current output at each setting.

In testimony whereof I affix my signature.

SHIRL HERR.